R. H. ANDERSON.
HORSE DETACHER.
APPLICATION FILED MAY 18, 1911.
1,044,119.
Patented Nov. 12, 1912.
2 SHEETS—SHEET 1.
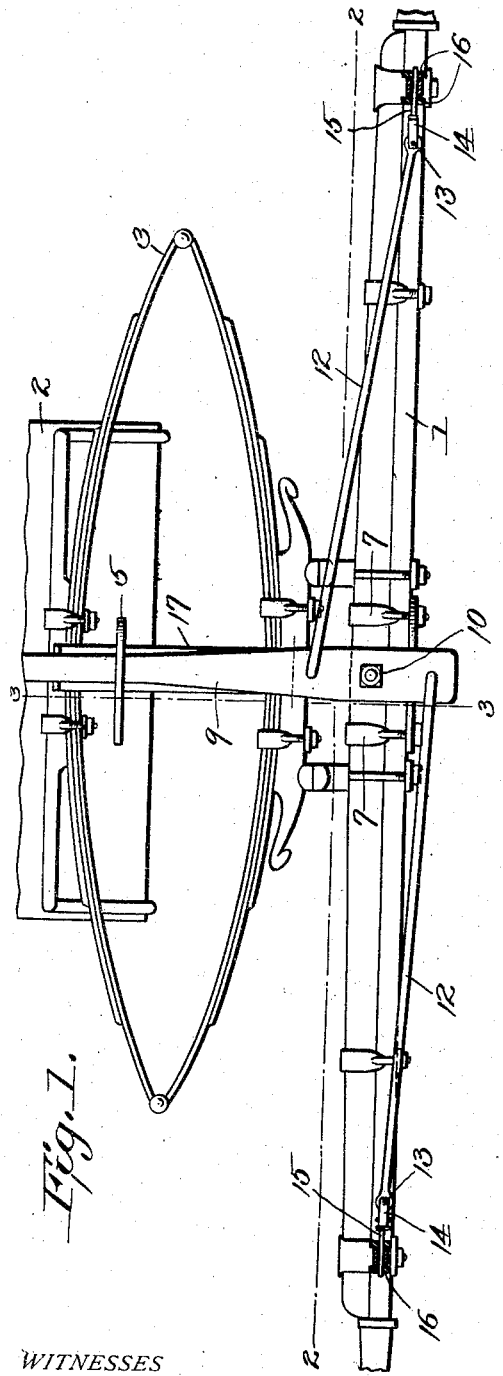
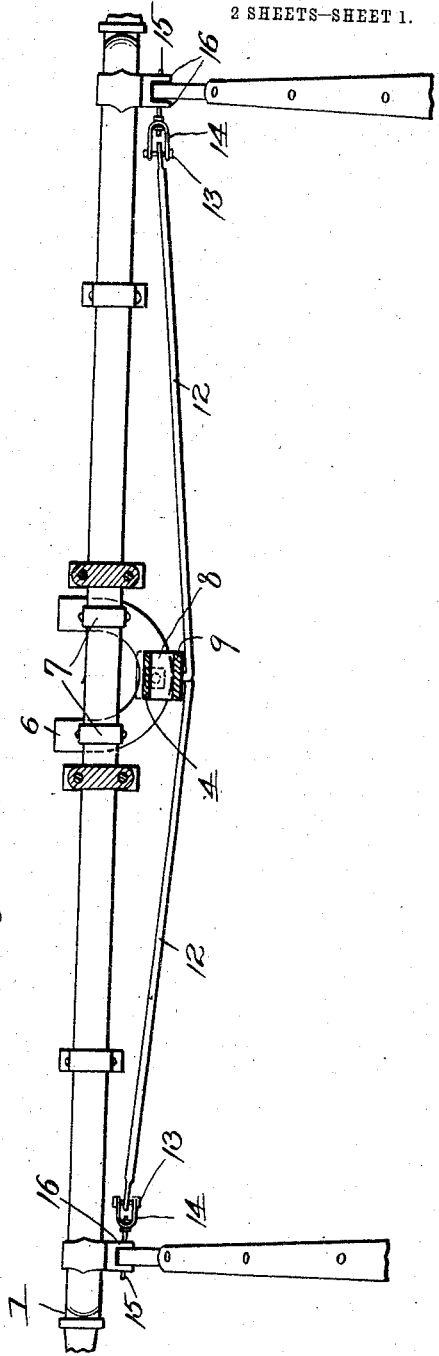
WITNESSES
Oliver W. Holmes
Harriet B. Cornwall
INVENTOR
R. H. Anderson
By
Attorney

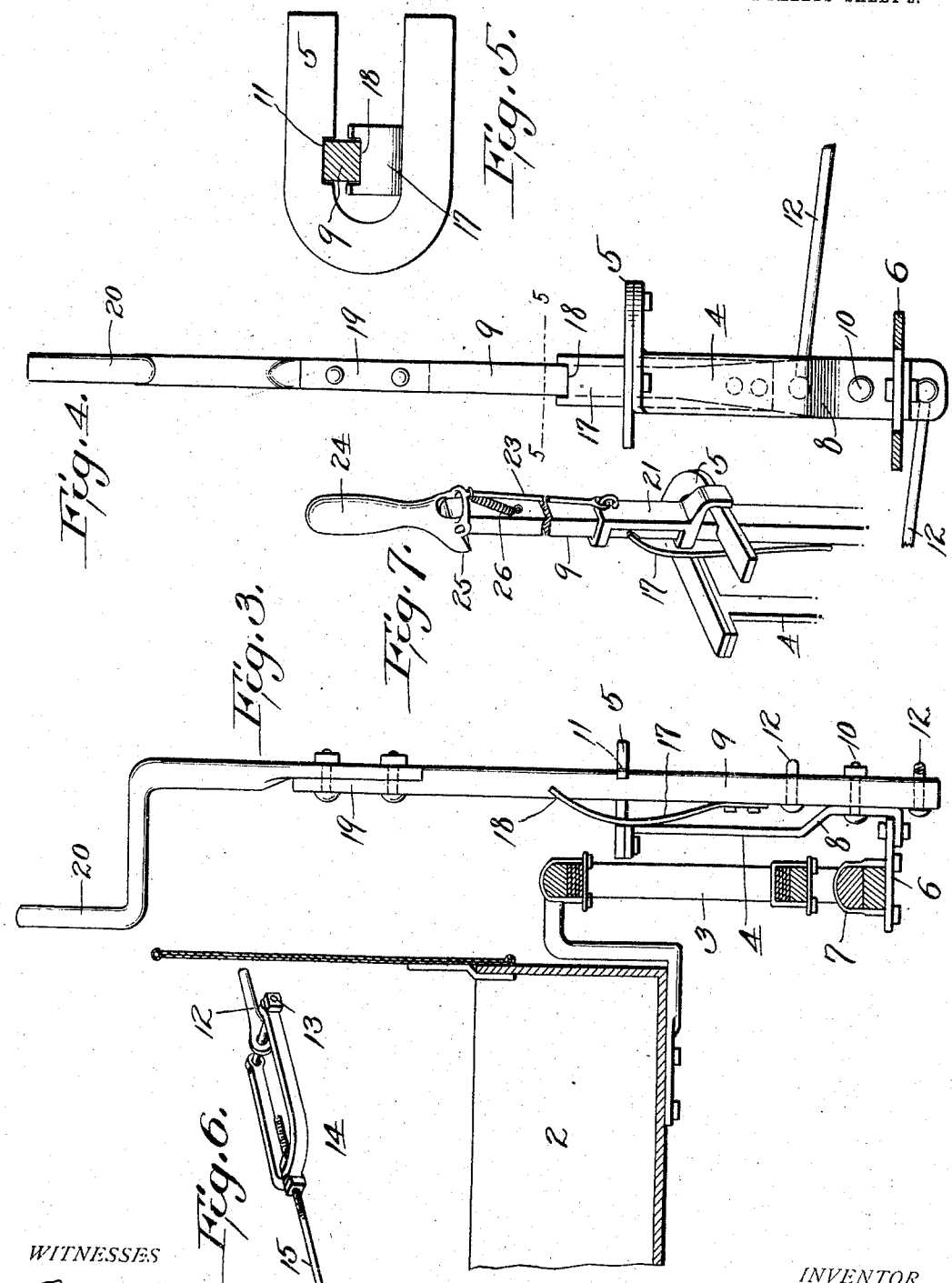

UNITED STATES PATENT OFFICE.

ROBERT H. ANDERSON, OF PORTALES, NEW MEXICO.

HORSE-DETACHER.

1,044,119.   Specification of Letters Patent.   Patented Nov. 12, 1912.

Application filed May 18, 1911. Serial No. 628,053.

*To all whom it may concern:*

Be it known that I, ROBERT H. ANDERSON, a citizen of the United States, residing at Portales, in the county of Roosevelt and State of New Mexico, have invented certain new and useful Improvements in Horse-Detachers, of which the following is a specification.

The present invention relates in general to vehicles, and more particularly to a horse releasing attachment which embodies novel features of construction whereby the shafts of a vehicle can be quickly and positively released from engagement with the front axle in the event the horse gets beyond the control of the driver.

The object of the invention is the provision of a device of this character which is comparatively simple and inexpensive in its construction, which can be readily applied to a vehicle without necessitating any material alternations therein, and which is always ready for operation, although it does not interfere in any manner with the usual operation of the vehicle and does not render the vehicle unsightly in appearance.

With these and other objects in view, the invention consists in certain novel combinations and arrangements of the parts, as will more fully appear as the description proceeds, the novel features thereof being pointed out in the appended claims.

For a full understanding of the invention, reference is to be had to the following description and accompanying drawings, in which:

Figure 1 is a front elevation of a horse detacher showing it as applied to the front axle of a vehicle, the upper end of the lever being broken away; Fig. 2 is a horizontal sectional view on the line 2—2 of Fig. 1; Fig. 3 is a vertical sectional view on the line 3—3 of Fig. 1; Fig. 4 is a front view of the lever and supporting bracket; Fig. 5 is an enlarged sectional view on the line 5—5 of Fig. 4; Fig. 6 is a detail view of the connection between the links and the spindles, and Fig. 7 is a detail view showing a modified form of the invention.

Corresponding and like parts are referred to in the following description and indicated in all the views of the drawings by like reference characters.

Referring to the drawings, the numeral 1 designates the front axle of a vehicle, and 2 the vehicle body which is supported by the springs 3, the usual fifth wheel construction being interposed between the springs and the axle. The operating mechanism of the horse detacher is mounted upon a bracket, the said bracket including an upright standard 4 provided at its upper end with a keeper 5 and at its lower end with an axle engaging member 6. This axle engaging member 6 is in the nature of a U-shaped plate which is horizontally disposed and has the two arms thereof secured to the bottom of the axle in some suitable manner as by means of the U-bolts 7, the curved portion of the U-shaped plate projecting in front of the axle and having the lower end of the upright standard 4 secured thereto. An offset portion 8 is provided at an intermediate point in the length of the standard 4 and throws the upper portion of the standard rearwardly. The keeper 5 is also in the nature of a horizontally disposed U-shaped plate which is arranged at right angles to the U-shaped plate 6 and opens toward one side of the vehicle, the said keeper projecting forwardly from the standard and having the rear arm thereof secured to the standard.

An operating lever 9 is pivotally connected by means of the bolt 10 to the lower end of the standard 4 and is normally received within a notch 11 formed in the inner face of the outer arm of the U-shaped keeper 5. The lower end of the lever projects below the bolt 10 and link members 12 are connected to the lever at points above and below the bolt, respectively, the said link members extending toward opposite sides of the vehicle and having their extremities perforated to receive transverse pins 13 connecting the ends of yoke members 14, the curved ends of the said yoke members having a threaded engagement with spindles 15 which project through the usual shaft receiving clips 16 on the axle and constitute the pivots upon which the shafts are mounted.

The lever 9 is normally held in engagement with the notch 11 by means of a leaf spring 17 which is secured to the rear side thereof opposite the offset portion of the standard. The lower end of this spring 17 is riveted or otherwise secured to the lever, while the upper end of the spring bears loosely against the lever and is notched at 18 to receive the same, the intermediate portion of the spring being curved outwardly and bearing against the rear arm of the U-shaped keeper 5 so as to throw the lever forwardly and hold it in the notch 11. The lever 9 is shown in the present instance as formed in sections which are detachably connected by the joint 19, and the upper end of the lever is extended rearwardly and provided with a handle 20 arranged within easy reach of the driver.

Should the horse become unruly and get beyond the control of the driver, it would be merely necessary for the driver to grasp the handle 20, pull rearwardly upon the said handle so as to compress the spring 17 and draw the lever 9 out of engagement with the notch 11, and then swing the lever laterally through the open mouth of the keeper 5 so as to draw inwardly upon the links 12 and pull the spindles 15 out of engagement with the shafts. The animal and shafts will then be entirely free from the vehicle, and the danger of serious injury to the driver and vehicle avoided.

A slight modification is shown in Fig. 7 in which a slide 21 is mounted upon the lever 9, the said slide being formed with a lip which normally engages the front of the keeper 5 and locks the lever in engagement with the notch 11. This slide 21 is connected by a link 23 to a rearwardly swinging hand lever 24 which is mounted upon the main lever 9 and is designed to lift the slide 21 out of engagement with the keeper 5 when pulled rearwardly, the movement of the hand lever being then limited by a stop 25 so that a continued pull thereon will operate as in the previous instance to compress the leaf spring 17. A spring 26 may be applied to the hand lever 24 for holding the same yieldingly at the forward limit of its movement, and after the main lever 9 has been disengaged from the notch 11, it is swung laterally as in the previous instance to withdraw the spindles 15 from the shaft engaging clips 16.

Having thus described the invention what I claim as new and desire to secure by Letters Patent is:

1. The combination of a standard provided with a laterally opening U-shaped keeper having a notch in one arm thereof, a lever pivoted upon the standard and adapted to be received within the keeper, a curved leaf spring carried by the lever, one end of the leaf spring being secured to the lever while the opposite end thereof has a sliding engagement therewith, the intermediate portion of the spring being bowed outwardly and serving to engage one side of the keeper to hold the lever in a yielding engagement with the beforementioned notch.

2. The combination of a standard provided with a laterally opening U-shaped keeper having a notch in one side thereof, a lever pivoted upon the standard and adapted to be received within the keeper, yielding means for throwing the lever in engagement with the notch, a slide mounted upon the lever and constructed to engage the keeper to lock the lever in a positive engagement with the notch, and a hand lever pivotally mounted upon the main lever and having an operative connection with the slide so as to move the slide into an inoperative position when force is applied to the handle for pushing the main lever out of the notch.

In testimony whereof I affix my signature in presence of two witnesses.

ROBERT H. ANDERSON.

Witnesses:
C. M. COMPTON, Jr.,
D. H. HOLDEN.

Copies of this patent may be obtained for five cents each, by addressing the "Commissioner of Patents, Washington, D. C."